(12) United States Patent
Li et al.

(10) Patent No.: US 10,129,161 B2
(45) Date of Patent: Nov. 13, 2018

(54) METHOD AND APPARATUS FOR HANDLING NETWORK JITTER

(71) Applicant: Xiaomi Inc., Beijing (CN)

(72) Inventors: Jing Li, Beijing (CN); Linzhang Wang, Beijing (CN); Shangui Liang, Beijing (CN); Zijing Wu, Beijing (CN)

(73) Assignee: Xiaomi Inc., Beijing (CN)

( * ) Notice: Subject to any disclaimer, the term of this patent is extended or adjusted under 35 U.S.C. 154(b) by 4 days.

(21) Appl. No.: 15/384,842

(22) Filed: Dec. 20, 2016

(65) Prior Publication Data

US 2017/0180263 A1    Jun. 22, 2017

(30) Foreign Application Priority Data

Dec. 21, 2015   (CN) .......................... 2015 1 0967352

(51) Int. Cl.
| | | |
|---|---|---|
| H04J 3/06 | (2006.01) | |
| H04L 12/841 | (2013.01) | |
| H04L 29/06 | (2006.01) | |
| H04L 12/861 | (2013.01) | |
| H04L 12/26 | (2006.01) | |

(52) U.S. Cl.
CPC ........ *H04L 47/283* (2013.01); *H04L 49/9005* (2013.01); *H04L 65/1083* (2013.01); *H04L 65/608* (2013.01); *H04L 65/80* (2013.01); *H04L 43/087* (2013.01)

(58) Field of Classification Search
None
See application file for complete search history.

(56) References Cited

U.S. PATENT DOCUMENTS

| | | | |
|---|---|---|---|
| 6,744,764 B1 | 6/2004 | Bigdeliazari et al. | |
| 7,110,422 B1 * | 9/2006 | Choudhury | ............. H04L 65/80 370/516 |
| 7,359,324 B1 * | 4/2008 | Ouellette | ............. H04L 43/087 370/230 |
| 2005/0207437 A1 * | 9/2005 | Spitzer | ................... H04L 12/66 370/412 |

(Continued)

FOREIGN PATENT DOCUMENTS

| | | |
|---|---|---|
| CN | 101491138 A | 7/2009 |
| CN | 101689946 A | 3/2010 |

(Continued)

OTHER PUBLICATIONS

Iwami et al., "A Study on Multimedia Realtime Communication on LAN," dated Jul. 8, 1993, 10 pages.

(Continued)

*Primary Examiner* — Minh-Trang Nguyen
(74) *Attorney, Agent, or Firm* — Finnegan, Henderson Farabow, Garrett & Dunner LLP

(57) ABSTRACT

A method for handling network jitter is provided. The method includes: receiving a plurality of data packets and recording a receiving time of each data packet; calculating time intervals between all adjacent data packets according to the receiving time of each data packet; identifying a probability distribution of the time intervals according to a plurality of preset intervals; calculating a target size of a buffer according to the probability distribution and an allowable jitter probability; and adjusting the buffer according to the target size of the buffer.

17 Claims, 10 Drawing Sheets

(56) References Cited

U.S. PATENT DOCUMENTS

| | | |
|---|---|---|
| 2008/0107137 A1 | 5/2008 | Yasui |
| 2008/0008203 A1 | 7/2008 | Frankkila et al. |
| 2008/0285599 A1 | 11/2008 | Johansson et al. |
| 2009/0003369 A1 | 1/2009 | Lundin |
| 2015/0350099 A1 | 12/2015 | Sun et al. |

FOREIGN PATENT DOCUMENTS

| | | |
|---|---|---|
| CN | 103685070 A | 3/2014 |
| CN | 103888381 A | 6/2014 |
| CN | 104301610 A | 1/2015 |
| CN | 105099949 A | 11/2015 |
| JP | H 11163892 A | 6/1999 |
| JP | 2003264583 A | 9/2003 |
| JP | 2008514961 A | 5/2008 |
| JP | 2008244894 A | 10/2008 |
| JP | 2011211624 A | 10/2011 |
| JP | 2014135637 A | 7/2014 |
| RU | 2236092 C1 | 9/2004 |
| RU | 2485695 C2 | 6/2013 |
| WO | WO 01/33787 A1 | 5/2001 |
| WO | WO 2004/038992 A1 | 5/2004 |
| WO | WO 2014/100331 A1 | 6/2014 |
| WO | WO 2015/160617 A1 | 10/2015 |

OTHER PUBLICATIONS

Office Action from Patent Office of the Russian Federation for Russian Application No. 2016148816, dated Dec. 11, 2017, 4 pages.

Search Report from Russian Patent Office Federation for Russian Application No. 2016148816, dated Nov. 30, 2017, 2 pages.

International Search Report for International Application No. PCT/CN2016/097257, dated Nov. 18, 2016, 4 pages.

Extended European Search Report for European Application No. 16203461.5, dated Apr. 20, 2017, 7 pages.

English version of International Search Report for International Application No. PCT/CN2016/097257, dated Nov. 18, 2016, 2 pages.

\* cited by examiner

800

METHOD AND APPARATUS FOR HANDLING NETWORK JITTER

CROSS-REFERENCE TO RELATED APPLICATION

This application is based upon and claims priority to Chinese Patent Application No. 201510967352.9, filed Dec. 21, 2015, the entire contents of which are incorporated herein by reference.

TECHNICAL FIELD

The present disclosure relates to the technical field of terminal device, and more particularly, to a method and an apparatus for handling network jitter.

BACKGROUND

With the increasing of network bandwidth, real-time speech communication applications utilizing the internet in a mobile phone, such as Voice over Internet Protocol (referred to as VoIP), have been developed. In a wireless network, packet loss rate, network delay, and network jitter affect the quality of real-time speech communication services.

In VoIP speech communication, a sending device usually implements a speech encoding algorithm with a fixed frame rate and sends data at uniform time intervals. In this case, the time interval jitter of the receiving device for receiving data has a great impact on the speech quality.

SUMMARY

According to a first aspect of the present disclosure, there is provided a method for handling network jitter, comprising: receiving a plurality of data packets and recording a receiving time of each data packet; calculating time intervals between all adjacent data packets according to the receiving time of each data packet; identifying a probability distribution of the time intervals according to a plurality of preset intervals; calculating a target size of a buffer according to the probability distribution and an allowable jitter probability; and adjusting the buffer according to the target size of the buffer.

According to a second aspect of the present disclosure, there is provided a terminal device, comprising: a processor; and a memory for storing instructions executable by the processor. The processor is configured to: receive a plurality of data packets and record a receiving time of each speech data packet; calculate time intervals between all adjacent data packets according to the receiving time of each data packet; identify a probability distribution of the time intervals according to a plurality of preset intervals; calculate a target size of a buffer according to the probability distribution and an allowable jitter probability; and adjust the buffer according to the target size of the buffer.

According to a third aspect of the present disclosure, there is provided a non-transitory readable storage medium comprising instructions, executable by a processor in a terminal device, for performing a method for handling network jitter, the method comprising: receiving a plurality of data packets and recording a receiving time of each data packet; calculating time intervals between all adjacent data packets according to the receiving time of each data packet; identifying a probability distribution of the time intervals according to a plurality of preset intervals; calculating a target size of a buffer according to the probability distribution and an allowable jitter probability; and adjusting the buffer according to the target size of the buffer.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1A:
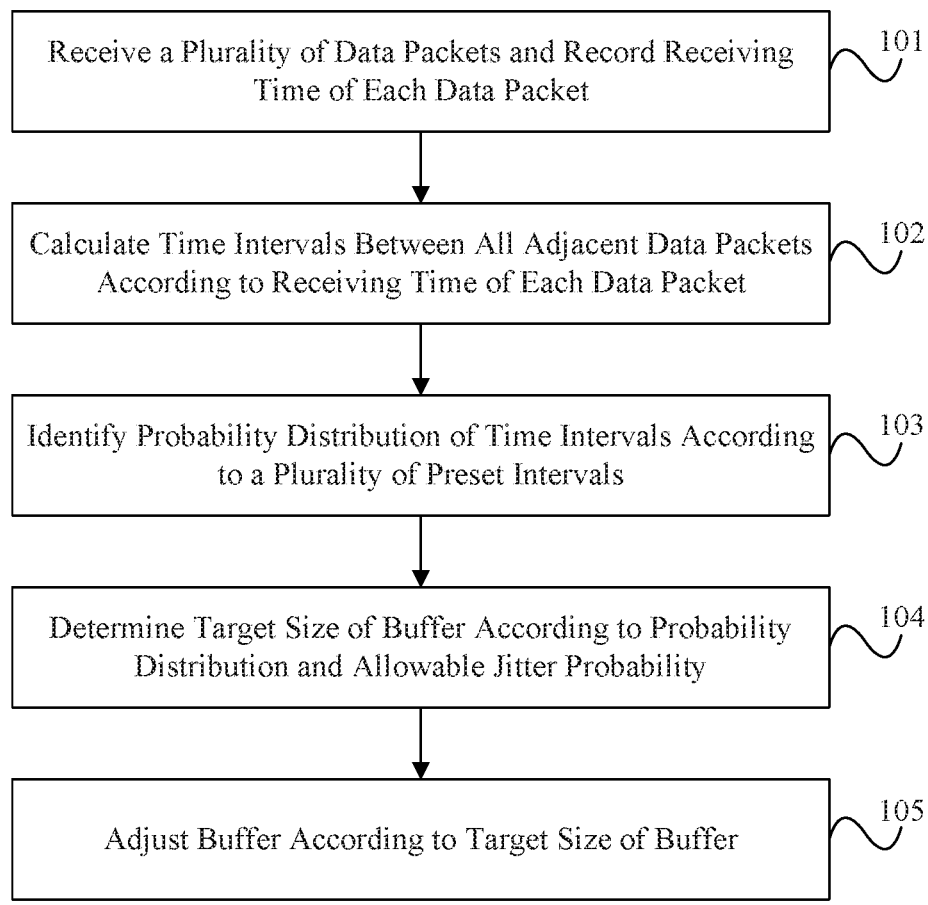
FIG. 1A is a flowchart of a method for handling network jitter, according to an exemplary embodiment.

FIG. 1A is a flowchart of a method 100a for handling network jitter, according to an exemplary embodiment. The method 100a may be performed by a terminal device. Referring to FIG. 1A, the method 100a includes the following steps.

In step 101, the terminal device receives a plurality of data packets and records a receiving time at which each data packet is received. For example, the data packets may be associated with a speech.

In some embodiments, two terminal devices may perform speech communication through VoIP, and a Real-time Transport Protocol is used by the two terminal devices during speech communication (RTP). A first terminal device may send one or more RTP messages to a second terminal device, where each RTP message includes speech data. The second terminal device may receive the RTP messages and record a receiving time of each RTP message.

In step 102, the terminal device calculates time intervals between all adjacent data packets according to the receiving time of each data packet.

For example, the nth time interval $J_n = R_n - R_{n-1}$, where $R_n$ represents the receiving time of the nth data packet, $R_{n-1}$ represents the receiving time of the (n-1)th data packet, $1 \le n \le (N-1)$, and N represents a total number of the data packets.

The time interval between adjacent data packets may be calculated according to the receiving time of each RTP message. For example, the receiving time of the (n-1)th data packet is $R_{n-1}$, the receiving time of the nth data packet is $R_n$, $J_n = R_n - R_{n-1}$ represents the nth time interval, the number of the received RTP messages is N, and $1 \le n \le (N-1)$.

In step 103, the terminal device identifies a probability distribution of the time intervals according to a plurality of preset intervals.

For example, the ith preset interval may be $$\left( \frac{(2i-1)T}{K}, \frac{(2i+1)T}{K} \right],$$

where T is a fixed time interval of sending the data packets by a sending device, K is a positive integer, and $i \ge 0$. For each preset interval $$\left( \frac{(2i-1)T}{K}, \frac{(2i+1)T}{K} \right],$$

the number $N_i$ of the time intervals that fall within this preset interval is identified. As $J_n$ changes with n, the time interval J of receiving two adjacent data packets is a random variable, and a ratio of the number $N_i$ of the time intervals corresponding to the preset interval to the total number N of the data packets is namely the probability $p_i$ of the random variable J that falls within the preset interval. The probability distribution of the random variable J can be acquired according to the probability $p_i$, $i \ge 0$ of the random variable J that falls within each preset interval. For example, K=8. The greater value of the K, the more accurate the probability distribution may be. However, an overlarge K value may cause insufficient data at some position of a probability distribution image, which results in data distortion.

In step 104, the terminal device determines a target size of a buffer according to the probability distribution and an allowable jitter probability.

For example, the allowable jitter probability represents a probability of overcoming the network jitter by the buffer. The probability sum $$\sum_{i=0}^{m} p_i$$

of the random variable J falling within the first (m+1) preset intervals and the probability sum $$\sum_{i=0}^{m+1} p_i$$

thereof falling within the first (m+2) preset intervals are accumulated. If the allowable jitter probability P satisfies the condition $$\sum_{i=0}^{m} p_i < P < \sum_{i=0}^{m+1} p_i,$$

a sum of the preset intervals between the 0th preset interval and the mth preset interval may be set as the target size of the buffer.

In step 105, the terminal device adjusts the buffer according to the target size of the buffer.

Figure 1B:
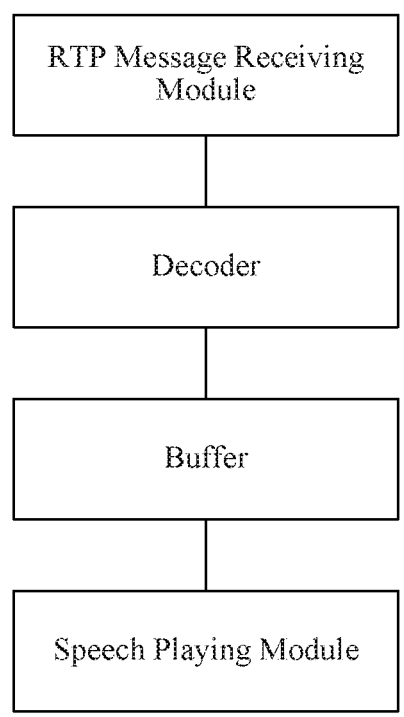
FIG. 1B is a block diagram of a receiving terminal device, according to an exemplary embodiment.

FIG. 1B is a block diagram of a receiving terminal device 100b, according to an exemplary embodiment. Referring to FIG. 1B, the receiving terminal device 100b includes an RTP message receiving module, a decoder, a speech playing module, and a buffer between the decoder and the speech playing module. The RTP message receiving module outputs the received data packet (e.g., an RTP message) to the decoder, and the decoder decodes the RTP message to acquire speech data or non-speech data, and stores the speech data or non-speech data into the buffer. For example, a length of the speech data or non-speech data acquired by decoding one RTP message is L, a total size of the buffer is K*L. The buffer may be divided into K blocks, the length of each block is L, and the indexes of the blocks are 0, 1, 2, ..., K-1 in sequence. The speech playing module reads data from the buffer to play it. For example, the speech playing module reads data from the block with an index of $P_{read}$ in the buffer to play, the decoder writes the decoded data into the block with an index of $P_{write}$, and $P_{write} - P_{read}$ represents the effective data length of the buffer, and also represents a delay generated in the buffer.

Because the size of the buffer is closely related to the ability of the buffer for overcoming the network jitter, the size of the buffer is adjusted to cope with the network jitter.

In the method 100a, the target size of the buffer is calculated through the probability distribution of the time interval and the allowable jitter probability. As the probability distribution of the receiving time intervals of the data packets varies with the network jitter, the target size of the buffer is adjusted accordingly to cope with the network jitter.

Figure 2:
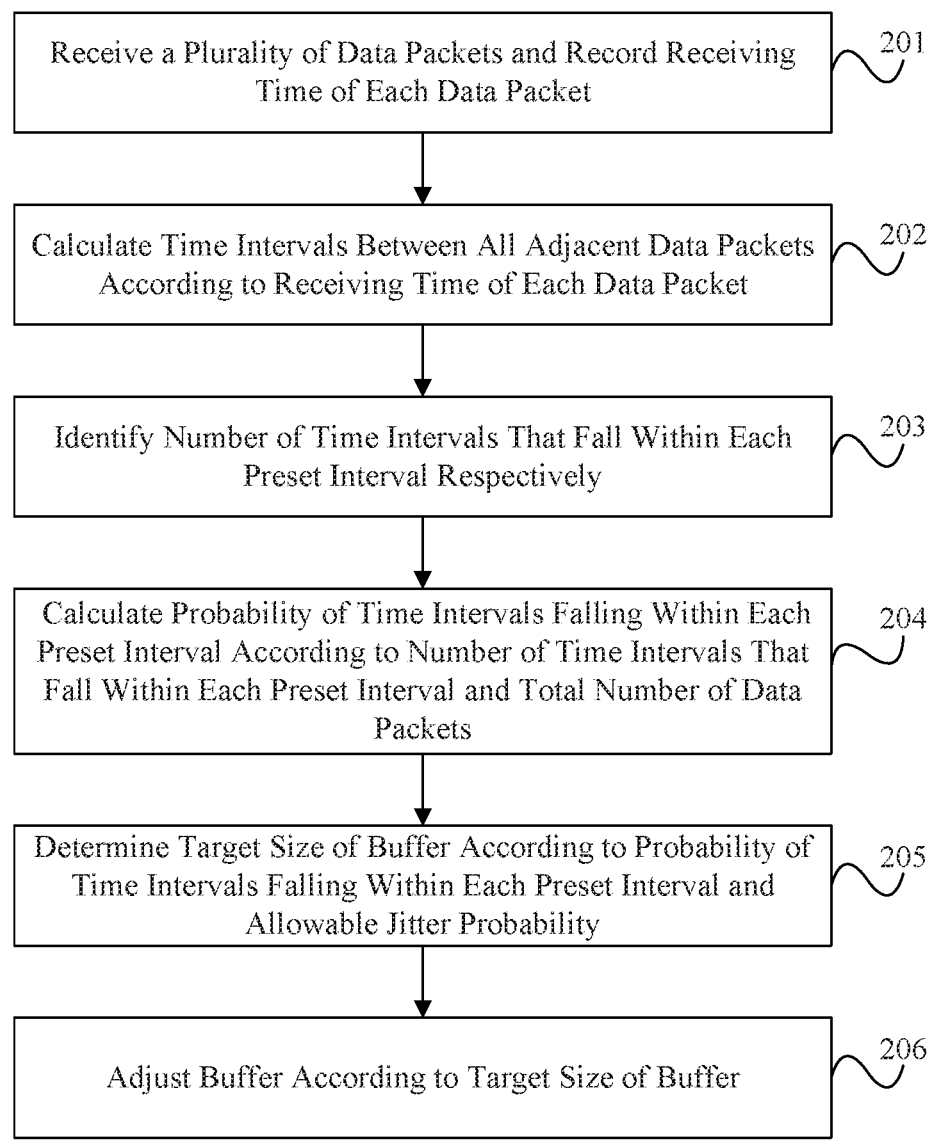
FIG. 2 is a flowchart of a method for handling network jitter, according to an exemplary embodiment.

FIG. 2 is a flowchart of a method 200 for handling network jitter, according to an exemplary embodiment. The method 200 may be performed by a terminal device. Referring to FIG. 2, the method 200 may include the following steps.

In step 201, the terminal device receives a plurality of data packets and records a receiving time of each data packet. For example, the data packets may be associated with a speech.

In step 202, the terminal device calculates time intervals between all adjacent data packets according to the receiving time of each data packet.

In step 203, the terminal device identifies a number $N_i$, $i \ge 0$ of the time intervals that fall within each preset interval respectively, wherein i represents an index of the preset interval, and $N_i \ge 0$.

For example, there are multiple preset intervals, and the ith preset interval is $$\left(\frac{(2i-1)T}{K}, \frac{(2i+1)T}{K}\right], i \geq 0,$$

where the number of the RTP messages is N, and the time intervals are $J_1, J_2 \ldots J_{N-1}$. The number of the time intervals in $J_1, J_2 \ldots J_{N-1}$ that fall within each preset interval is identified, where the number of the time intervals in $J_1, J_2 \ldots J_{N-1}$ that fall within the ith preset interval is represented by $N_i$. For example, $J_2$, $J_3$ and $J_{10}$ in $J_1, J_2 \ldots J_{N-1}$ satisfy conditions $$\frac{(2i-1)T}{K} < J_2 \leq \frac{(2i+1)T}{K}, \frac{(2i-1)T}{K} < J_3 \leq \frac{(2i+1)T}{K} \text{ and}$$

$$\frac{(2i-1)T}{K} < J_{10} \leq \frac{(2i+1)T}{K}.$$

Then three values in $J_1, J_2 \ldots J_{N-1}$ fall within the ith preset interval, and $N_i=3$.

In step 204, the terminal device calculates a probability $$p_i = \frac{N_i}{N}$$

of the time intervals falling within each preset interval according to each $N_i$ and the total number N of the data packets.

For example, $$p_i = \frac{N_i}{N}$$

is the probability of the random variable J falling within the ith preset interval.

In step 205, the terminal device determines a target size of a buffer according to the probability of the time intervals falling within each preset interval an allowable jitter probability.

In step 206, the terminal device adjusts the buffer according to the target size of the buffer.

In the method 200, to acquire the probability distribution of the time intervals, the probability of the time intervals falling within each preset interval is derived by identifying the number of the time intervals in all the time intervals that fall within each preset interval respectively, and using the ratio of the number of the time intervals in each preset interval to the total number of the data packets as the probability of the time intervals falling within the preset interval.

Figure 3:
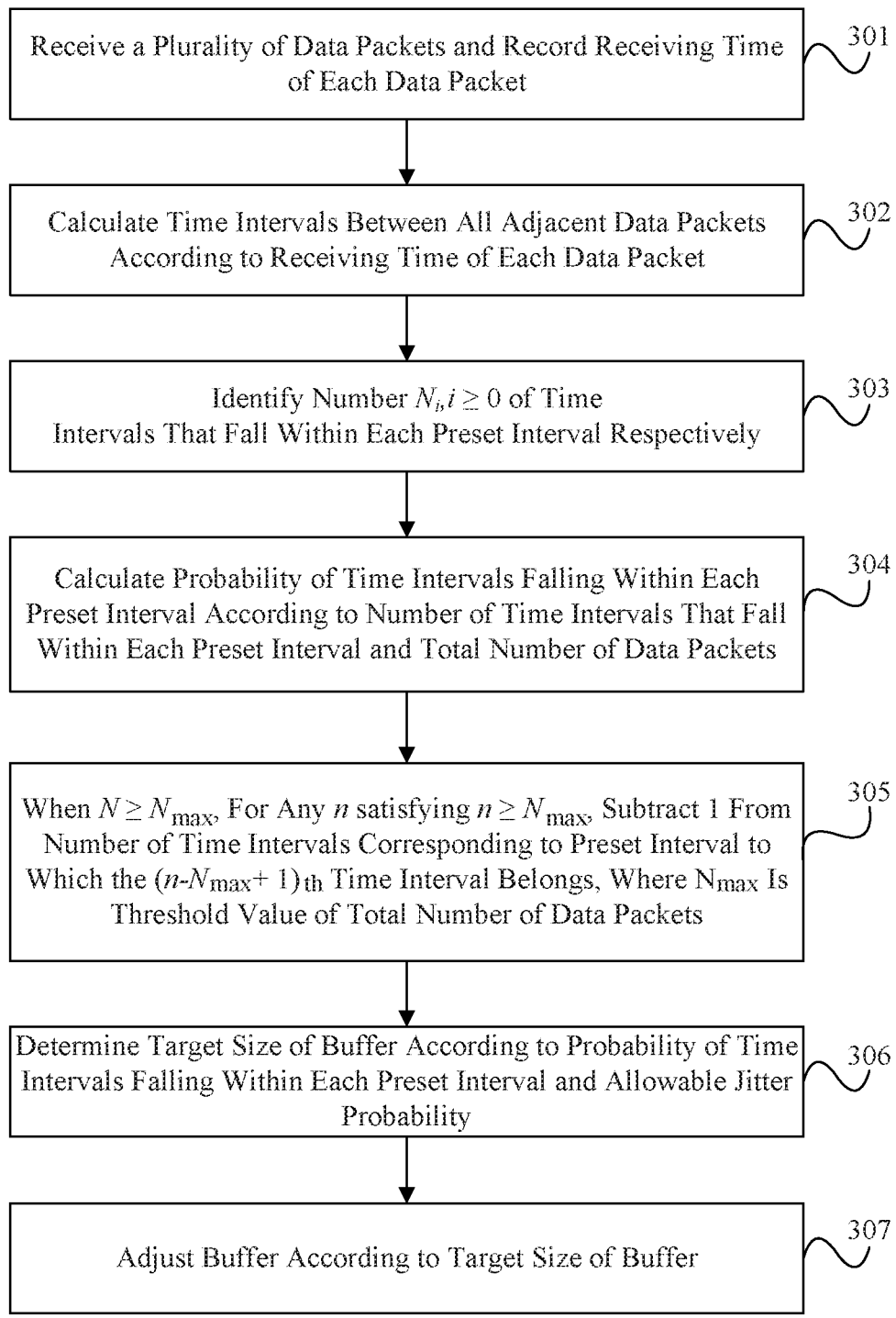
FIG. 3 is a flowchart of a method for handling network jitter, according to an exemplary embodiment.

FIG. 3 is a flowchart of a method 300 for handling network jitter, according to an exemplary embodiment. The method 300 may be performed by a terminal device. Referring to FIG. 3, the method 300 may include the following steps.

In step 301, the terminal device receives a plurality of data packets and records a receiving time of each data packet. For example, the data packets may be associated with a speech.

In step 302, the terminal device calculates time intervals between all adjacent data packets according to the receiving time of each data packet.

In step 303, the terminal device identifies the number $N_i$, $i \geq 0$ of the time intervals that fall within each preset interval respectively, wherein i represents an index of the preset interval, and $N_i \geq 0$.

In step 304, the terminal device calculates a probability $$p_i = \frac{N_i}{N}$$

of the time intervals falling within each preset interval according to each $N_i$ and the total number N of the data packets.

In step 305, when $N \geq N_{max}$, for any n that is greater than or equal to $N_{max}$, the terminal device subtracts 1 from the number of the time intervals corresponding to the preset interval to which the $(n-N_{max}+1)$th time interval belongs, where $N_{max}$ is a threshold value of the total number of the data packets.

For example, the terminal device has received 1000 data packets, the sequence numbers of the 1000 data packets are 0, 1, 2 . . . , 999 in sequence, the 1000 data packets are corresponding to 999 time intervals, i.e., $J_1, J_2 \ldots J_{999}$, and the threshold value of the total number of the data packets is 1000. When the terminal device receives the 1000th data packet, $J_{1000}$ is calculated. Suppose that $J_{1000}$ belongs to the 10th preset interval, then the number of the time intervals that fall within the 10th preset interval increases by 1, and meanwhile, the statistical value corresponding to the preset interval to which $J_1$ belongs decreases by 1. Similarly, when the terminal device receives the 1001th data packet, $J_{1001}$ is calculated. Suppose that $J_{1001}$ belongs to the 8th preset interval, then the number of the time intervals that fall within the 8th preset interval increases by 1, and meanwhile, the statistical value corresponding to the preset interval to which $J_2$ belongs decreases by 1. As a result, when a new time interval is added, one oldest time interval is removed, so as to ensure that the total number of the time intervals is unchanged with the increasing of the data packets received by the terminal device.

In step 306, the terminal device determines a target size of a buffer according to the probability of the time intervals falling within each preset interval and an allowable jitter probability.

In step 307, the terminal device adjusts the buffer according to the target size of the buffer.

In the method 300, by removing one oldest time interval every time when a new time interval is added, the total number of the time intervals distributed in the preset intervals is unchanged with the increasing of the data packets received by the terminal device.

Figure 4:
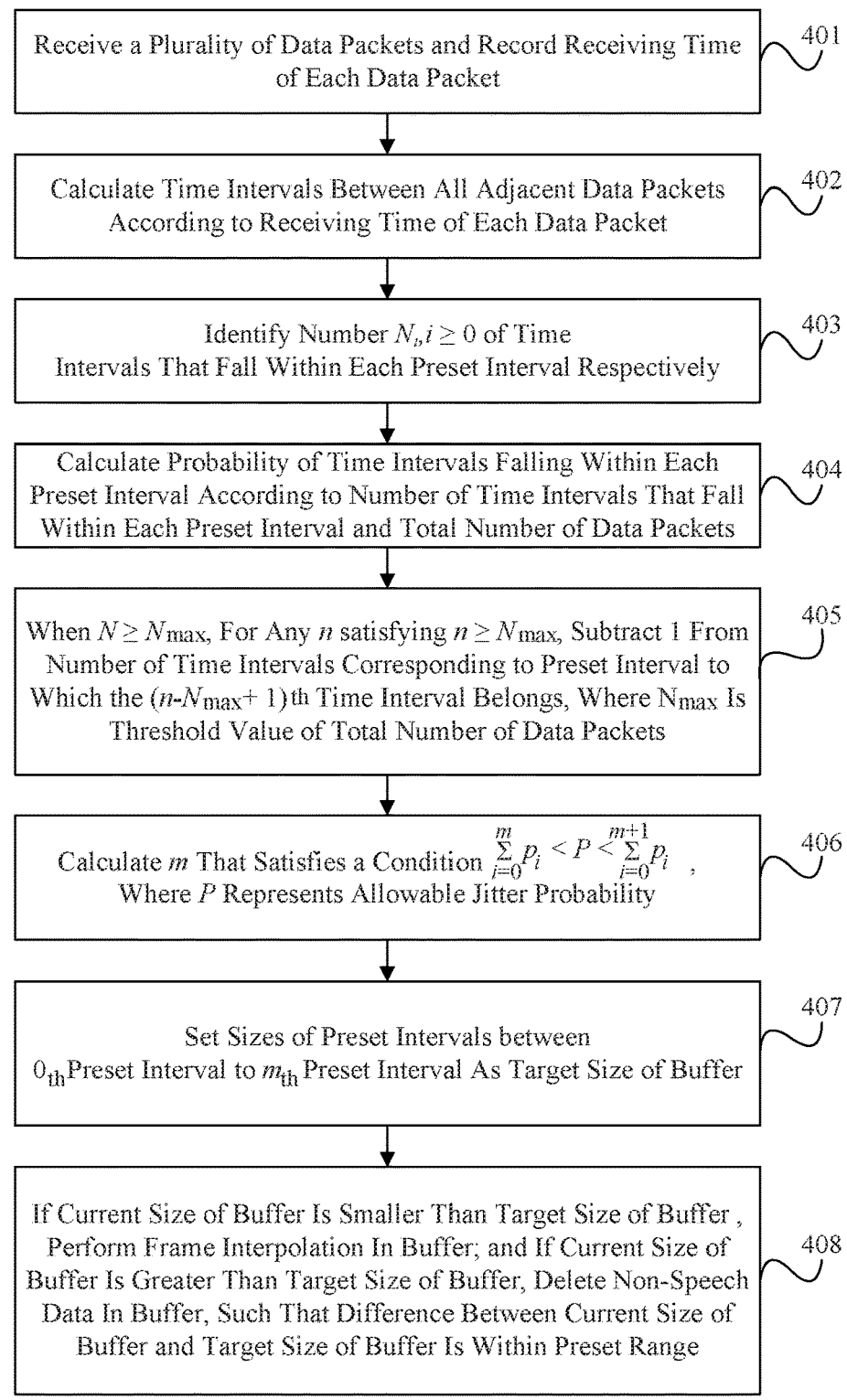
FIG. 4 is a flowchart of a method for handling network jitter, according to an exemplary embodiment.

FIG. 4 is a flowchart of a method 400 for handling network jitter, according to an exemplary embodiment. The method 400 may be performed by a terminal device. Referring to FIG. 4, the method 400 may include the following steps.

In step 401, the terminal device receives a plurality of data packets and records the receiving time of each data packet. For example, the data packets may be associated with a speech.

In step 402, the terminal device calculates time intervals between all adjacent data packets according to the receiving time of each data packet.

In step 403, the terminal device identifies a number $N_i$, $i \geq 0$ of the time intervals that fall within each preset interval respectively, where i represents an index of the preset interval, and $N_i \geq 0$.

In step 404, the terminal device calculates a probability $$p_i = \frac{N_i}{N}$$

of the time intervals falling within each preset interval according to each $N_i$ and the total number N of the data packets.

In step 405, when $N \geq N_{max}$, for any n that satisfies $n \geq N_{max}$, the terminal device subtracts 1 from the number of the time intervals corresponding to the preset interval to which the $(n-N_{max}+1)$th time interval belongs, where $N_{max}$ is a threshold value of the total number of the data packets, and n is a sequence number of the data packet.

In step 406, the terminal device calculates m that satisfies a condition $$\sum_{i=0}^{m} p_i < P < \sum_{i=0}^{m+1} p_i,$$

where P represents an allowable jitter probability.

The allowable jitter probability represents the probability of overcoming the network jitter by the buffer. The probability sum $$\sum_{i=0}^{m} p_i$$

of the random variable J falling within the first (m+1) preset intervals and the probability sum $$\sum_{i=0}^{m+1} p_i$$

thereof falling within the first (m+2) preset intervals are accumulated. The value P of the allowable jitter probability may be preset, so as to calculate m that satisfies the condition $$\sum_{i=0}^{m} p_i < P < \sum_{i=0}^{m+1} p_i.$$

In step 407, the terminal device sets a sum of sizes of the preset intervals between the 0th preset interval and the mth preset interval as the target size of the buffer.

In step 408, if a current size of the buffer is smaller than the target size of the buffer, the terminal device performs frame interpolation in the buffer; and if the current size of the buffer is greater than the target size of the buffer, then non-speech data in the buffer is deleted, such that a difference between the current size of the buffer and the target size of the buffer is within a preset range.

For example, if the current size of the buffer is smaller than the target size of the buffer, the terminal device may perform frame interpolation as follows: for speech data, repeating based on a pitch period so as to ensure steady speech; and for non-speech data, generating and smoothing noises according to the estimated power of background noises. As another example, if the current size of the buffer is greater than the target size of the buffer, the terminal device may delete the non-speech data in the buffer until the difference between the current size of the buffer, and the target size of the buffer is within a preset range.

In the method 400, the size of the buffer is dynamically adjusted with the network jitter by calculating the target size of the buffer according to the probability distribution of the time interval and the allowable jitter probability. By adjusting the current size of the buffer according to the target size of the buffer, such that the issue network jitter is relieved.

Figure 5:
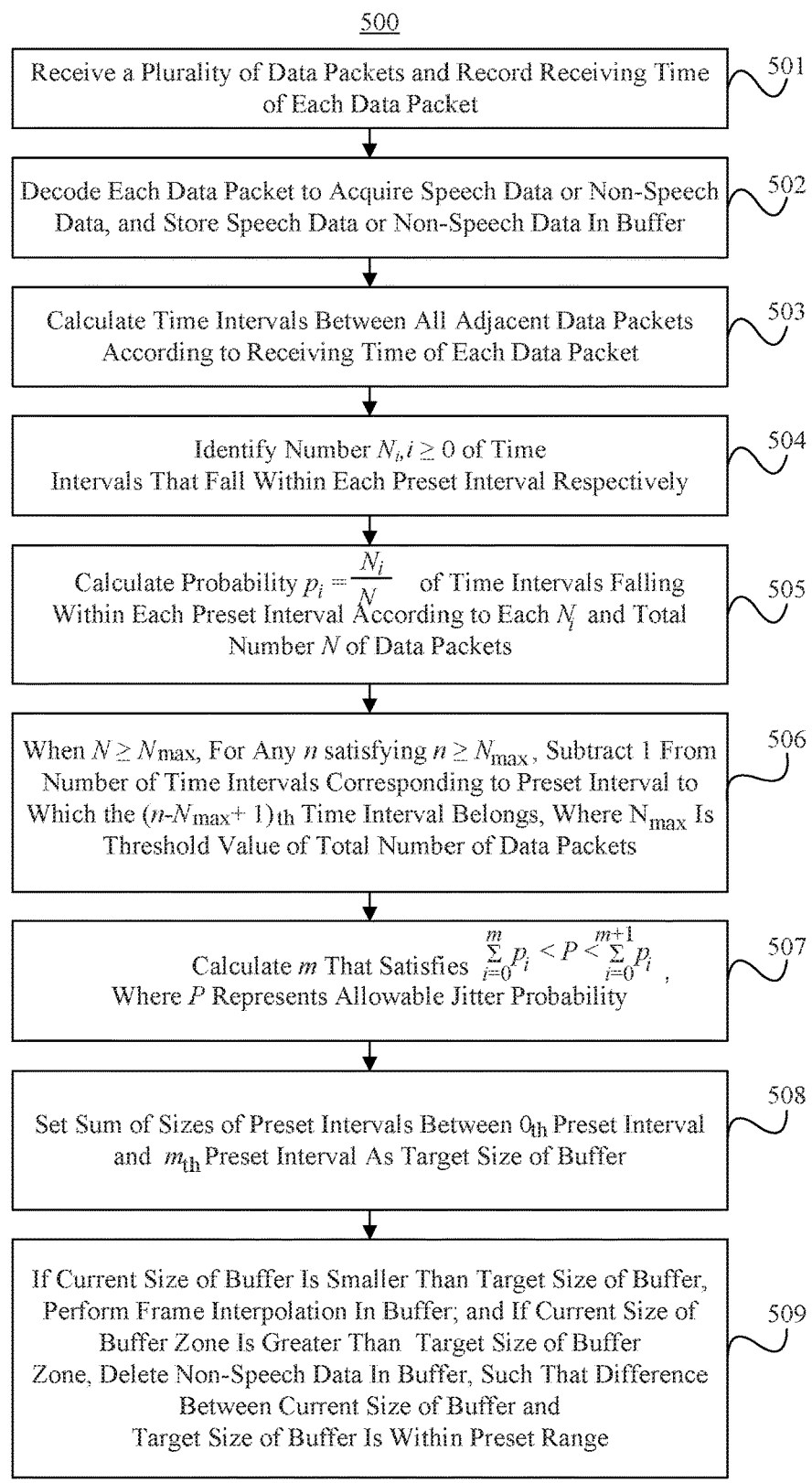
FIG. 5 is a flowchart of a method for handling network jitter, according to an exemplary embodiment.

FIG. 5 is a flowchart of a method 500 for handling network jitter, according to an exemplary embodiment. The method 500 may be performed by a terminal device. Referring to FIG. 5, the method 500 may include the following steps.

In step 501, the terminal device receives a plurality of data packets and records a receiving time of each data packet. For example, the data packets may be associated with a speech.

In step 502, the terminal device decodes each data packet to acquire speech data or non-speech data and stores the speech data or the non-speech data in a buffer.

For example, step 502 may be implemented consistent with the descriptions provided in connection with FIG. 1B, and will not be repeated herein.

In step 503, the terminal device calculates time intervals between all adjacent data packets according to the receiving time of each data packet.

In step 504, the terminal device identifies a number $N_i$, $i \geq 0$ of the time intervals that fall within each preset interval respectively, where i represents an index of the preset interval, and $N_i \geq 0$.

In step 505, the terminal device calculates a probability $$p_i = \frac{N_i}{N}$$

of the time intervals falling within each preset interval according to each $N_i$ and the total number N of the data packets.

In step 506, when $N \geq N_{max}$, for any n satisfying $n \geq N_{max}$, the terminal device subtracts the number of the time intervals corresponding to the preset interval to which the $(n-N_{max}+1)$th time interval belongs by 1, where $N_{max}$ is a threshold value of the total number of the data packets, and n is a sequence number of the data packet.

In step 507, the terminal device calculates m that satisfies a condition $$\sum_{i=0}^{m} p_i < P < \sum_{i=0}^{m+1} p_i,$$

where P represents an allowable jitter probability.

The allowable jitter probability represents the probability of overcoming the network jitter by the buffer. The probability sum $$\sum_{i=0}^{m} p_i$$

of the random variable J falling within the first (m+1) preset intervals and the probability sum $$\sum_{i=0}^{m+1} p_i$$

thereof falling within the first (m+2) preset intervals are accumulated. The value P of the allowable jitter probability may be preset, so as to calculate m that satisfies the condition $$\sum_{i=0}^{m} p_i < P < \sum_{i=0}^{m+1} p_i.$$

In step 508, the terminal device sets a sum of sizes of the preset intervals between the 0th preset interval and the mth preset interval as the target size of the buffer.

In step 509, if a current size of the buffer is smaller than the target size of the buffer, and an effective length of the buffer is 0, the terminal device performs frame interpolation in the buffer; and if the current size of the buffer is greater than the target size of the buffer, the terminal device deletes non-speech data in the buffer, such that a difference between the current size of the buffer and the target size of the buffer is within a preset range.

For example, the target length of the buffer is 3 under a certain network condition and a given allowable packet loss rate, and due to network blockage, the effective length in the buffer becomes 2. At this time, frame interpolation is not performed. If blocked data packets arrive continuously, the effective length of the buffer will increase, and frame interpolation is not needed at this time, If the blocked data packets do not arrive continuously, the effective length of the buffer becomes 0, then the frame interpolation is performed.

As the network condition becomes poorer while the allowable packet loss rate remains unchanged, the target length of the buffer may become longer. In other words, the target size of the buffer increases when the network jitter increases. For instance, the target length becomes 5, allowing four frames of data to be played in the buffer during blockage. If the blocked data packets do not arrive continuously after the four frames of data are played, then the frame interpolation is performed. The increased target length of the buffer reduces the probability of performing the frame interpolation of the buffer, such that the tone quality is improved.

As the network condition becomes better while the allowable packet loss rate keeps unchanged, the target length of the buffer becomes shorter. In other words, the target size of the buffer decreases when the network jitter decreases. For instance, the target length becomes 1, which means that the delay introduced in the buffer is one frame only, and the delay becomes short. In case of network blockage, frame interpolation is needed after one frame of data is played.

As the network condition keeps unchanged while the allowable packet loss rate becomes greater, the target length of the buffer becomes longer, which means that the delay increases, but the probability of performing the frame interpolation decreases. This is the cost of a user setting a greater allowable packet loss rate.

As the network condition keeps unchanged while the allowable packet loss rate becomes lower, the target length of the buffer becomes shorter, which means that the delay is decreased, but the probability of performing the frame interpolation is increased. This is because that the user accepts more packet loss frame interpolation in return for shorter delay.

In the method 500, by adding a buffer between a decoder and a speech playing module of the terminal device storing the speech data or non-speech data into the buffer, and adjusting the buffer dynamically, the network jitter is resolved.

Figure 6:
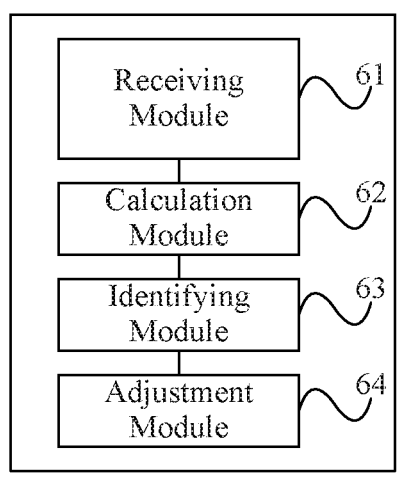
FIG. 6 is a block diagram of an apparatus for handling network jitter, according to an exemplary embodiment.

FIG. 6 is a block diagram of an apparatus 600 for handling network jitter, according to an exemplary embodiment. For example, the apparatus 600 may be implemented as a part of a terminal device. Referring to FIG. 6, the apparatus 600 includes a receiving module 61, a calculation module 62, an identifying module 63, and an adjustment module 64.

The receiving module 61 is configured to receive a plurality of data packets and record a receiving time of each data packet. For example, the data packets may be associated with a speech.

The calculation module 62 is configured to calculate a time interval between receiving adjacent data packets according to the receiving times.

The identifying module 63 is configured to identify a probability distribution of the time intervals according to a plurality of preset intervals.

The calculation module 62 is further configured to calculate a size of a buffer according to the probability distribution and an allowable jitter probability.

The adjustment module 64 is configured to adjust the buffer according to the size of the buffer.

In the apparatus 600, the size of the buffer changes with the network jitter, and the network jitter can be coped with by adjusting the buffer according to the size of the buffer.

Figure 7:
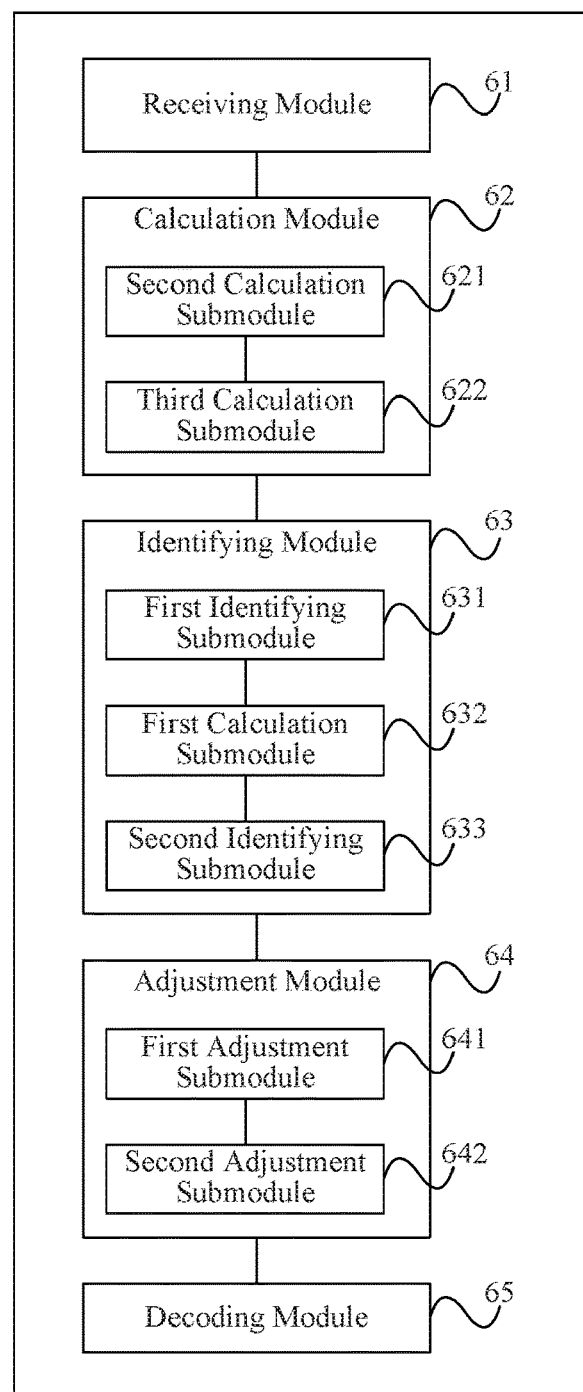
FIG. 7 is a block diagram of an apparatus for handling network jitter, according to an exemplary embodiment.

FIG. 7 is a block diagram of an apparatus 700 for handling network jitter, according to an exemplary embodiment. For example, the apparatus 700 may be implemented as a part of a terminal device. Referring to FIG. 7, the apparatus 700 includes a receiving module 61, a calculation module 62, an identifying module 63, an adjustment module 64, and a decoding module 65. In this embodiment, the nth time interval is calculated as $J_n = R_n - R_{n-1}$, where $R_n$ represents the receiving time of the nth data packet, $R_{n-1}$ represents the receiving time of the (n−1)th data packet, $1 \leq n \leq (N-1)$, and N represents a total number of the data packets. The number of the preset intervals is more than one, and the ith preset interval is $$\left( \frac{(2i-1)T}{K}, \frac{(2i+1)T}{K} \right],$$

where T is a time interval of sending the data packets by a sending device, and K is a positive integer.

Referring to FIG. 7, the identifying 63 includes a first identifying submodule 631, a first calculation submodule 632, and a second identifying submodule 633.

The first identifying submodule 631 is configured to identify a number $N_i$, $i \geq 0$ of time intervals that fall within each preset interval respectively, where i represents an index of the preset interval, and $N_i \geq 0$.

The first calculation submodule 632 is configured to calculate a probability $$p_i = \frac{N_i}{N}$$

of the time interval falling within each preset interval according to each $N_i$ and the total number N of the data packets.

The second identifying submodule 633 is configured to, when $N \geq N_{max}$, for any n satisfying $n \geq N_{max}$, subtract 1 from the number of the time intervals corresponding to the preset interval to which the $(n-N_{max}+1)$th time interval belongs, where $N_{max}$ is a threshold value of the total number of the data packets.

Referring to FIG. 7, the calculation module 62 includes a second calculation submodule 621 and a third calculation submodule 622.

The second calculation submodule 621 is configured to calculate m that satisfies a condition $$\sum_{i=0}^{m} p_i < P < \sum_{i=0}^{m+1} p_i,$$

where P represents an allowable jitter probability.

The third calculation submodule 622 is configured to calculate a sum of sizes of the preset intervals between the 0th preset interval and the mth preset interval, the sum being the target size of the buffer.

Referring to FIG. 7, the adjustment module 64 includes a first adjustment submodule 641 and a second adjustment submodule 642.

The first adjustment submodule 641 is configured to, if a current size of the buffer is smaller than the target size of the buffer, and an effective length of the buffer is 0, perform frame interpolation in the buffer.

The second adjustment submodule 642 is configured to, if the current size of the buffer is greater than the target size of the buffer, delete non-speech data in the buffer, such that a difference between the current size of the buffer and the target size of the buffer is within a preset range.

The decoding module 65 is configured to, after the receiving module 61 receives the data packets and records the receiving time of each data packet, decode each data packet to acquire speech data or non-speech data, and store the speech data or the non-speech data into the buffer.

In the apparatus 700, by removing one oldest time interval every time when a new time interval is added, the total number of the time intervals distributed in each preset interval is unchanged with the increasing of the data packets received by the terminal device. The size of the buffer is dynamically adjusted with the network jitter, so as to cope with the network jitter.

Figure 8:
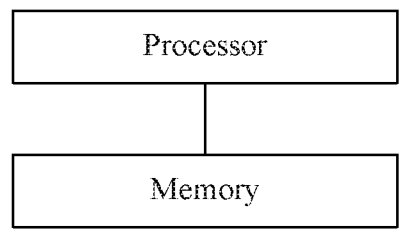
FIG. 8 is a block diagram of a terminal device, according to an exemplary embodiment.

FIG. 8 is a block diagram of a terminal device 800, according to an exemplary embodiment. Referring to the terminal device 800 includes a processor and a memory for storing instructions executable by the processor. The processor may be configured to perform various functions and data processing by operating programs stored in the memory. For example, the processor may be configured to execute instructions so as to perform all or a part of the steps in the above described methods.

Figure 9:
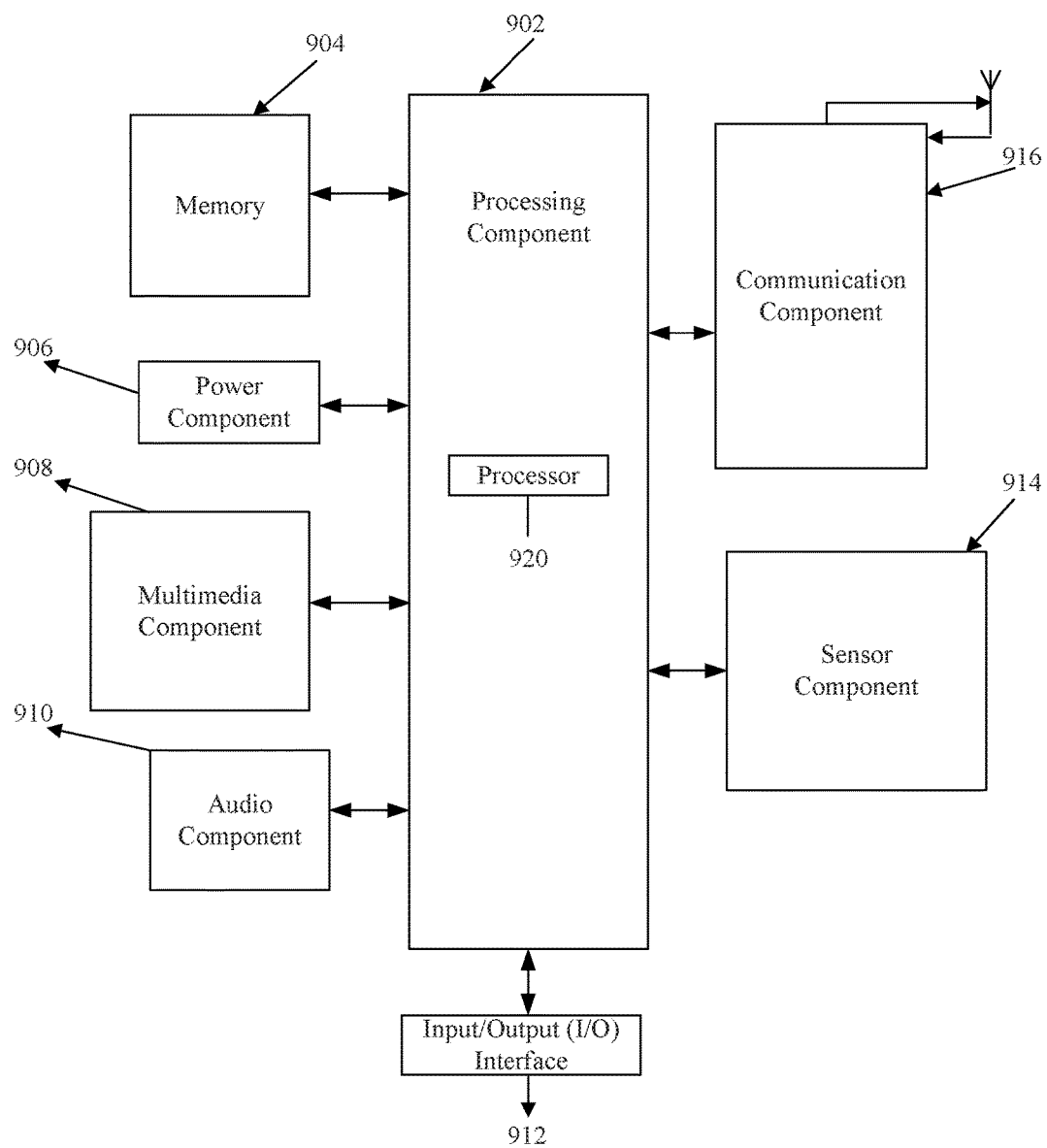
FIG. 9 is a block diagram of another terminal device, according to an exemplary embodiment.

FIG. 9 is a block diagram of another terminal device 900, according to an exemplary embodiment. For example, the terminal device 900 may be a mobile phone, a computer, a digital broadcast terminal, a messaging device, a gaming console, a tablet, a medical device, exercise equipment, a personal digital assistant, and the like.

Referring to FIG. 9, the terminal device 900 may include one or more of the following components: a processing component 902, a memory 904, a power component 906, a multimedia component 908, an audio component 910, an input/output (I/O) interface 912, a sensor component 914, and a communication component 916. The person skilled in the art should appreciate that the structure of the terminal device 900 as shown in FIG. 9 does not intend to limit the terminal device 900. The terminal device 900 may include more or less components or combine some components or other components.

The processing component 902 typically controls overall operations of the terminal device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. The processing component 902 performs various functions and data processing by operating programs and modules stored in the memory 904. Examples of such data include instructions for any applications or methods operated on the terminal device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 is configured to provide power to various components of the terminal device 900. The power component 906 may include a power management system, one or more power sources, and any other components associated with the generation, management, and distribution of power in the terminal device 900.

The multimedia component 908 includes a screen providing an output interface between the terminal device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the terminal device 900 is in an operation mode, such as a call mode, a recording mode, and/or a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the terminal device 900. For instance, the sensor component 914 may detect an open/closed status of the device 900, relative positioning of components, e.g., the display and the keypad, of the terminal device 900, a change in position of the terminal 900 or a component of the terminal device 900, a presence or absence of user contact with the terminal device 900, an orientation or an acceleration/deceleration of the terminal device 900, and a change in temperature of the terminal device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the terminal device 900 and other devices. The terminal device 900 can access a wireless network based on a communication standard, such as WiFi, 2G, or 3G, or a combination thereof. In one exemplary embodiment, the communication component 916 receives a broadcast signal or broadcast information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In exemplary embodiments, the terminal device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the terminal device 900, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the invention as come within known or customary practice in the art. It is intended that the specification and examples be considered as exemplary only, with a true scope and spirit of the invention being indicated by the following claims.

It will be appreciated that the invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for handling network jitter, comprising:
receiving a plurality of data packets and recording a receiving time of each data packet;
calculating time intervals between all adjacent data packets according to the receiving time of each data packet, wherein the nth time interval $J_n$ is calculated as $J_n=R_n-R_{n-1}$, $R_n$ represents the receiving time of the nth data packet, $R_{n-1}$ represents the receiving time of the (n−1)th data packet, $1 \leq n \leq (N-1)$, N represents a total number of the data packets, the ith preset interval is $$\left(\frac{(2i-1)T}{K}, \frac{(2i+1)T}{K}\right],$$

T is a time interval of sending the data packets, and K is a positive integer;
identifying a probability distribution of the time intervals according to a plurality of preset intervals, wherein identifying the probability distribution of the time intervals comprises:
identifying a number $N_i$, $i \geq 0$ of time intervals that fall within each preset interval, wherein i represents an index of the preset interval, and $N_i \geq 0$; and
calculating a probability $$p_i = \frac{N_i}{N}$$

of the time intervals that fall within each preset interval according to each $N_i$ and the total number N of the data packets;
calculating a target size of a buffer according to the probability distribution and an allowable jitter probability; and
adjusting the buffer according to the target size of the buffer.

2. The method according to claim 1, wherein when $N \geq N_{max}$, if $n \geq N_{max}$, subtracting one from the number of the time intervals corresponding to the preset interval to which the $(n-N_{max}+1)$th time interval belongs, wherein $N_{max}$ is a threshold value of the total number of the data packets.

3. The method according to claim 2, wherein the calculating the target size of the buffer according to the probability distribution and the allowable jitter probability comprises:
calculating m that satisfies a condition $$\sum_{i=0}^{m} p_i < P < \sum_{i=0}^{m+1} p_i,$$

wherein P represents the allowable jitter probability; and
setting a sum of sizes of the preset intervals between the 0th preset interval to the mth preset interval as the target size of the buffer.

4. The method according to claim 1, wherein the adjusting the buffer comprises:
if a current size of the buffer is smaller than the target size of the buffer, and an effective length of the buffer is 0, performing frame interpolation in the buffer; and
if the current size of the buffer is greater than the target size of the buffer, deleting non-speech data from the buffer, such that a difference between the current size of the buffer and the target size of the buffer is within a preset range.

5. The method according to claim 4, further comprising:
decoding each data packet to acquire speech data or non-speech data after receiving the plurality of data packets, and storing the speech data or the non-speech data into the buffer.

6. The method according to claim 1, wherein the target size of the buffer increases when the network jitter increases, and the target size of the buffer decreases when the network jitter decreases.

7. The method according to claim 1, wherein the plurality of data packets are associated with a speech.

8. The method according to claim 7, wherein the plurality of data packets are Real-time Transport Protocol (RTP) messages.

9. A terminal device, comprising:
a processor; and
a memory for storing instructions executable by the processor;
wherein the processor is configured to:
receive a plurality of data packets and record a receiving time of each speech data packet;
calculate time intervals between all adjacent data packets according to the receiving time of each data packet, wherein the nth time interval $J_n$ is calculated as $J_n = R_n - R_{n-1}$, $R_n$ represents the receiving time of the nth speech data packet, $R_{n-1}$ represents the receiving time of the (n−1)th speech data packet, $1 \leq n \leq (N-1)$, N represents a total number of the data packets the ith preset interval is $$\left( \frac{(2i-1)T}{K}, \frac{(2i+1)T}{K} \right],$$

T is a time interval of sending the data packets, and K is a positive integer;
identify a probability distribution of the time intervals according to a plurality of preset intervals, wherein in identifying the probability distribution of the time intervals, the processor is further configured to:
identify a number $N_i$, $i \geq 0$ of time intervals that fall within each preset interval, wherein i represents an index of the preset interval, and $N_i \geq 0$; and
calculate a probability $$p_i = \frac{N_i}{N}$$

of the time intervals that fall within each preset interval according to each $N_i$ and the total number N of the data packets;
calculate a target size of a buffer according to the probability distribution and an allowable jitter probability; and
adjust the buffer according to the target size of the buffer.

10. The terminal device according to claim 9, wherein the processor is further configured to:
when $N \geq N_{max}$, if $n \geq N_{max}$, subtract one from the number of the time intervals corresponding to the preset interval to which the $(n-N_{max}+1)$th time interval belongs, wherein $N_{max}$ is a threshold value of the total number of the speech data packets.

11. The terminal device according to claim 10, wherein the processor is further configured to:
calculate m that satisfies a condition $$\sum_{i=0}^{m} p_i < P < \sum_{i=0}^{m+1} p_i,$$

wherein P represents the allowable jitter probability; and
calculate a sum of sizes of the preset intervals continuously between the 0th preset interval and the mth preset interval, the sum being set as the target size of the buffer.

12. The terminal device according to claim 9, wherein the processor is further configured to:
if a current size of the buffer is smaller than the target size of the buffer, and an effective length of the buffer is 0, perform frame interpolation in the buffer; and
if the current size of the buffer is greater than the target size of the buffer, delete non-speech data in the buffer, such that a difference between the current size of the buffer and the target size of the buffer is within a preset range.

13. The terminal device according to claim 12, wherein the processor is further configured to:
after the plurality of data packets are received, decode each data packet to acquire speech data or non-speech data, and store the speech data or the non-speech data into the buffer.

14. The terminal device according to claim 9, wherein the target size of the buffer increases when the network jitter increases, and the target size of the buffer decreases when the network jitter decreases.

15. The terminal device according to claim 9, wherein the plurality of data packets are associated with a speech.

16. The terminal device according to claim 15, wherein the plurality of data packets are Real-time Transport Protocol (RTP) messages.

17. A non-transitory readable storage medium comprising instructions, executable by a processor in a terminal device, for performing a method for handling network jitter, the method comprising:

receiving a plurality of data packets and recording a receiving time of each data packet;

calculating time intervals between all adjacent data packets according to the receiving time of each data packet, wherein the nth time interval $J_n$ is calculated as $J_n = R_n - R_{n-1}$, $R_n$ represents the receiving time of the nth data packet, $R_{n-1}$ represents the receiving time of the (n−1)th data packet, $1 \leq n \leq (N-1)$, N represents a total number of the data packets, the ith preset interval is $$\left( \frac{(2i-1)T}{K}, \frac{(2i+1)T}{K} \right],$$

T is a time interval of sending the data packets, and K is a positive integer;

identifying a probability distribution of the time intervals according to a plurality of preset intervals, wherein identifying the probability distribution of the time intervals comprises:

identifying a number $N_i$, $i \geq 0$ of time intervals that fall within each preset interval, wherein i represents an index of the preset interval, and $N_i \geq 0$; and calculating a probability $$p_i = \frac{N_i}{N}$$

of the time intervals that fall within each preset interval according to each $N_i$ and the total number N of the data packets;

calculating a target size of a buffer according to the probability distribution and an allowable jitter probability; and adjusting the buffer according to the target size of the buffer.

* * * * *